United States Patent
Lin et al.

(10) Patent No.: US 12,287,529 B2
(45) Date of Patent: Apr. 29, 2025

(54) IMAGE CAPTURE APPARATUS AND ZOOM LENS

(71) Applicants: Sintai Optical (Shenzhen) Co., Ltd., ShenZhen (CN); Asia Optical Co., Inc., Taichung (TW)

(72) Inventors: Guo-Quan Lin, ShenZhen (CN); Kazutaka Goami, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 571 days.

(21) Appl. No.: 17/585,711

(22) Filed: Jan. 27, 2022

(65) Prior Publication Data
US 2022/0252827 A1 Aug. 11, 2022

(30) Foreign Application Priority Data

Feb. 5, 2021 (CN) .......................... 20212033443.X
Mar. 24, 2021 (CN) ........................ 202120596338.3
(Continued)

(51) Int. Cl.
*G02B 7/10* (2021.01)
*G02B 7/02* (2021.01)
(Continued)

(52) U.S. Cl.
CPC ............... *G02B 7/10* (2013.01); *G02B 7/021* (2013.01); *G02B 13/0065* (2013.01);
(Continued)

(58) Field of Classification Search
CPC ...... G02B 7/10; G02B 7/021; G02B 13/0065; G02B 13/009; G02B 15/144; G02B 27/646; H01F 7/081; H04N 23/69; G03B 13/34
See application file for complete search history.

(56) References Cited

U.S. PATENT DOCUMENTS 4,331,389 A * 5/1982 Ogawa ............... G02B 15/1441
359/687
4,534,624 A * 8/1985 Toda ........................ G02B 7/04
359/823
(Continued)

FOREIGN PATENT DOCUMENTS

CN 1912670 A 2/2007
CN 103123432 A 5/2013
(Continued)

OTHER PUBLICATIONS

W. F. Long, Apertures, 1992, pp. 1-5 [online], [retrieved May 6, 2023], retrieved from the Internet <URL: https://drdrbill.com/downloads/optics/geometric-optics/Apertures.pdf>. (Year: 1992).*
(Continued)

*Primary Examiner* — Cara E Rakowski
*Assistant Examiner* — Wesley Scott Ashton
(74) *Attorney, Agent, or Firm* — McClure, Qualey & Rodack, LLP

(57) ABSTRACT

An image capture apparatus and a zoom lens are provided. The zoom lens in accordance with an exemplary embodiment of the invention includes a mount, a guide unit, a plurality of lens groups and a driving device. The guide unit is disposed in the mount in a first direction. The lens groups are disposed in the mount and include at least one movable lens group which can be moved along the guide unit. The driving device is configured for driving the movable lens group. The driving device includes magnets and coils. The magnets are fixed to one of the movable lens group and the mount, while the coils are fixed to the other of the movable lens group and the mount. The magnets and/or the coils are arranged in the first direction.

20 Claims, 9 Drawing Sheets

(30) Foreign Application Priority Data

Sep. 10, 2021 (CN) .......................... 202111063150.3
Dec. 7, 2021 (TW) .............................. 110145687

(51) Int. Cl.
| | |
|---|---|
| *G02B 13/00* | (2006.01) |
| *G02B 15/14* | (2006.01) |
| *H01F 7/08* | (2006.01) |
| *H04N 23/69* | (2023.01) |

(52) U.S. Cl.
CPC ......... *G02B 13/009* (2013.01); *G02B 15/144* (2019.08); *H01F 7/081* (2013.01); *H04N 23/69* (2023.01)

(56) References Cited

U.S. PATENT DOCUMENTS

| | | | | |
|---|---|---|---|---|
| 4,749,269 | A * | 6/1988 | Nakashima | G02B 7/10 359/823 |
| 5,272,567 | A * | 12/1993 | Inoue | G02B 7/10 359/698 |
| 11,277,548 | B2 * | 3/2022 | Park | H04N 23/6812 |
| 2006/0285840 | A1 * | 12/2006 | Takahashi | H04N 23/6812 348/E5.046 |
| 2007/0273364 | A1 | 11/2007 | Takei et al. | |
| 2019/0121053 | A1 | 4/2019 | Hagiwara | |
| 2020/0409015 | A1 * | 12/2020 | Kim | G03B 3/10 |
| 2021/0018719 | A1 * | 1/2021 | Park | G03B 5/00 |
| 2021/0063680 | A1 * | 3/2021 | Kim | G03B 13/36 |
| 2021/0231904 | A1 * | 7/2021 | Son | G02B 7/023 |
| 2021/0389551 | A1 * | 12/2021 | Jang | G02B 7/09 |
| 2023/0097275 | A1 * | 3/2023 | Lin | G02B 7/04 359/822 |
| 2023/0266570 | A1 * | 8/2023 | Goami | H04N 23/55 359/683 |

FOREIGN PATENT DOCUMENTS

| | | | |
|---|---|---|---|
| CN | 103969915 | A | 8/2014 |
| CN | 110488451 | A | 11/2019 |
| CN | 110989127 | A | 4/2020 |
| CN | 111045183 | A | 4/2020 |
| CN | 111788519 | A | 10/2020 |
| CN | 211698530 | U | 10/2020 |
| JP | 3244287 | B2 | 1/2002 |
| JP | 2007025221 | A | 2/2007 |
| JP | 2009217863 | A | 9/2009 |
| KR | 20180012150 | A * | 2/2018 |
| TW | 200622466 | A | 7/2006 |
| TW | M370110 | U | 12/2009 |
| TW | 201248233 | A | 12/2012 |
| WO | WO-2005078501 | A1 * | 8/2005 ............... G02B 7/08 |

OTHER PUBLICATIONS

Herbert Gross (ed.), Handbook of Optical Systems, vol. 3: Aberration Theory and Correction of Optical Systems 377-379 (2007). (Year: 2007).*

Mary G. Turner, Lens Design OPTI 517, 2018, pp. 1-67 [online], [retrieved Jan. 2, 2025], retrieved from the Internet <URL: https://wp.optics.arizona.edu/jsasian/wp-content/uploads/sites/33/2018/10/Zoom_1.pdf>. (Year: 2018).*

* cited by examiner

IMAGE CAPTURE APPARATUS AND ZOOM LENS

BACKGROUND OF THE INVENTION

Field of the Invention

The invention relates to the optical field, and more particularly to an image capture apparatus and a zoom lens.

Description of the Related Art

Periscope lenses are widely applied in portable electric devices. Current periscope lenses are generally prime lenses (i.e. fixed-focal lenses) due to the limitations of thickness or volume of the electric device. However, with development of electric devices, both zoom function and miniaturization of lenses are required by users. That is, performing zoom operation in a limited space of the electric device is required.

BRIEF SUMMARY OF THE INVENTION

As described, zoom function and miniaturization of lenses cannot be simultaneously provided. To address the issue, the invention provides a zoom lens that has a small volume to meet the requirements of miniaturization.

The zoom lens in accordance with an exemplary embodiment of the invention includes a mount, a guide unit, a plurality of lens groups and a driving device. The guide unit is disposed in the mount in a first direction. The lens groups are disposed in the mount and include at least one movable lens group which can be moved along the guide unit. The driving device is configured for driving the movable lens group. The driving device includes magnets and coils. The magnets are fixed to one of the movable lens group and the mount, while the coils are fixed to the other of the movable lens group and the mount. The magnets and/or the coils are arranged in the first direction.

In another exemplary embodiment, the zoom lens further includes a location sensing device electrically connected to the driving device wherein the location sensing device includes a location magnet fixed to the movable lens group, and a location sensor fixed to the mount. The guide unit includes a guide rod, a guide ball, a rolling ball, a resilient element or a guide rail, for guiding the movable lens group to move along the guide unit in a first direction.

In yet another exemplary embodiment, the movable lens group include side surfaces corresponding to the mount, the side surfaces include a concave magnet containing portion or a concave location-magnet containing portion, the magnets are disposed in the magnet containing portion, and the location magnet is disposed in the location-magnet containing portion.

In another exemplary embodiment, the location-magnet containing portion is disposed under the magnet containing portion. The mount further includes a first side wall, a second side wall, a third side wall and a fourth side wall, wherein the first side wall and the second side wall are disposed opposite to each other, the third side wall and the fourth side wall are disposed opposite to each other, the guide unit includes two guide rods, one of the guide rods is connected between upper portions of the first side wall and the second side wall and is disposed near one of the third side wall and the fourth side wall, and the other of the guide rods is connected between the upper portions or between lower portions of the first side wall and the second side wall and is disposed near the other of the third side wall and the fourth side wall. The magnets are fixed to the side surface of the movable lens group, and the coils are fixed to inner sides of the third side wall and the fourth side wall of the mount.

In yet another exemplary embodiment, the movable lens group includes a side surface and a mounting portion disposed on the side surface and extending in the first direction, the mounting portion and the mount are disposed with respect to each other, and the magnets or the coils are fixed to the mounting portion.

In another exemplary embodiment, the mounting portion is L-shaped and includes a first portion connected to the side surface of the movable group and a second portion extending from the first portion towards the mount.

In yet another exemplary embodiment, the lens groups include at least two movable lens groups, the mount includes two side walls, the mounting portions of two adjacent movable lens groups and the side walls of the mount are disposed corresponding to each other, and the mounting portions of the movable lens groups extend towards each other in the first direction.

In another exemplary embodiment, the guide unit includes a guide rod, the movable lens group includes a rolling ball corresponding to the guide rod, and the rolling ball contacts the guide rod and is movable along the guide rod in the first direction.

In yet another exemplary embodiment, the guide unit includes at least two guide rod groups, each guide rod group includes two guide rods disposed adjacent to each other. The movable lens group further includes a lens frame and a plurality of spacers, the spacers are fixed to the lens frame and arranged in a second direction, the rolling ball is disposed between the spacers, the rolling ball is rollable, and the first direction is perpendicular to the second direction. The lens frame defines a recess, the spacers are firmly disposed in the recess, the spacers include ball containing portions, and the ball containing portions are concave or are holes. The mount further includes a first side wall, a second side wall, a third side wall and a fourth side wall, the first side wall and the second side wall are disposed opposite to each other, the third side wall and the fourth side wall are disposed opposite to each other, one of the guide rods is connected between upper portions of the first side wall and the second side wall and is disposed near one of the third side wall and the fourth side wall, and the other of the guide rods is connected between the upper portions or between lower portions of the first side wall and the second side wall and is disposed near the other of the third side wall and the fourth side wall.

In another exemplary embodiment, the guide unit includes at least two guide rod groups, each guide rod group includes two guide rods disposed adjacent to each other. The lens frame defines a recess, the movable lens group further includes a resilient element, and a rolling ball holder firmly disposed in the recess, the rolling ball holder defines an opening, the resilient element and the rolling ball are disposed in the rolling ball holder, the resilient element is propped against the rolling ball in a second direction so that the rolling ball protrudes from the opening, a diameter of the rolling ball is greater than a dimension of the opening, and the second direction is perpendicular to the first direction. The rolling ball holder is base that is conical and has a trapezoidal section when sectioned along a plane perpendicular to a third direction. The mount further includes a first side wall, a second side wall, a third side wall and a fourth side wall, the first side wall and the second side wall are disposed opposite to each other, the third side wall and the fourth side wall are disposed opposite to each other, one of the guide rods is connected between upper portions of the first side wall and the second side wall and is disposed near one of the third side wall and the fourth side wall, and the other of the guide rods is connected between the upper portions or between lower portions of the first side wall and the second side wall and is disposed near the other of the third side wall and the fourth side wall.

In yet another exemplary embodiment, the zoom lens further includes a fixed aperture stop disposed between an object side and an image side, wherein the movable lens group includes a connecting sleeve movably coupled to the guide unit, and the fixed aperture stop includes a bent portion to provide a space for receiving the connecting sleeve.

In yet another exemplary embodiment, the lens groups further includes a fixed lens group, the movable lens group includes a cushion element, and the fixed lens group and the fixed aperture stop includes contact portions corresponding to the cushion element. The zoom lens further includes cushioning material provided on the contact portions of the fixed lens group and the fixed aperture stop.

An image capture apparatus in accordance with an exemplary embodiment of the invention includes a zoom lens. The zoom lens includes a light path turning module, a lens module, an image forming module and a driving device whereby light passes through the light path turning module and the lens module to form an image on the image forming module. The lens module includes a first lens group, a second lens group, a third lens group and a fourth lens group, wherein the first lens group and the fourth lens group are fixed. The driving device is configured to move the second lens group and the third lens group with respect to the image forming device in a direction parallel to an optical axis of the zoom lens. The second lens group and the third lens group are respectively moved towards the first lens group and the fourth lens group, when driven by the driving device in a zoom state. The second lens group and the third lens group are moved close to each other when driven by the driving device in another zoom state.

The zoom lens of the invention is able to change the focal length and provide stable and smooth zoom or focus operation. As compared to the conventional zoom lens, the zoom lens of the invention is able to operate without any noise or abnormal noise. Besides, the volume of the zoom lens is not increased that can meet the requirement of miniaturization of lenses.

DETAILED DESCRIPTION OF THE INVENTION

The purposes, technical solutions and merits of the invention can be more fully understood by reading the subsequent detailed description and embodiments with references made to the accompanying drawings. However, it is understood that the subsequent detailed description and embodiments are only used for explaining the invention. The invention is not limited thereto.

Figure 1:
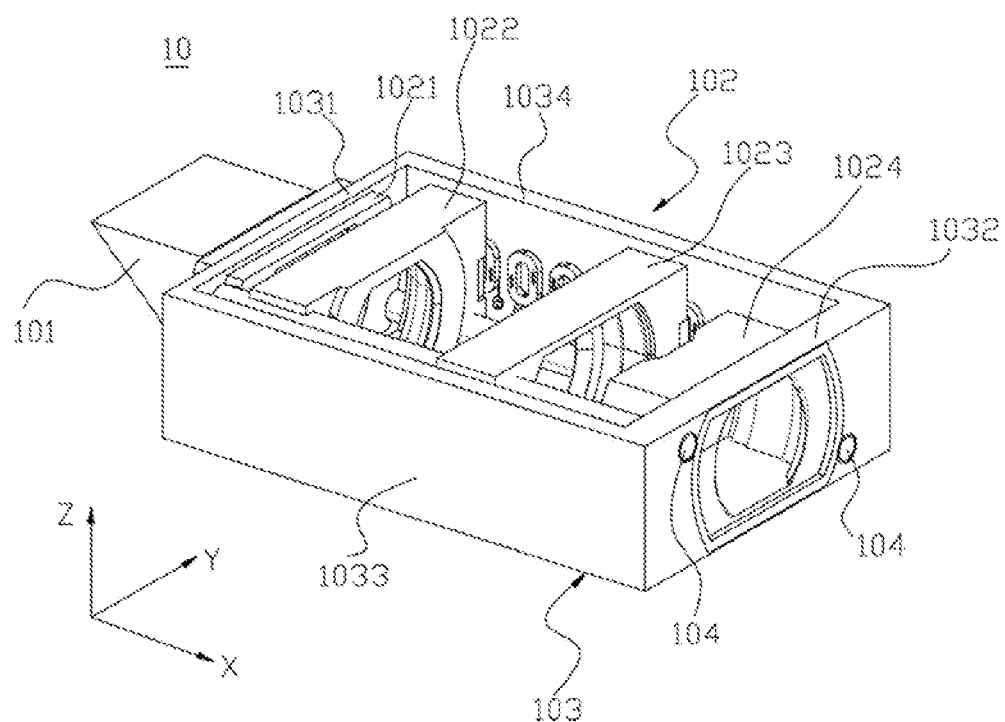
FIG. 1 is a schematic diagram showing the structure of a zoom lens in accordance with a first embodiment of the invention.
Figure 2:
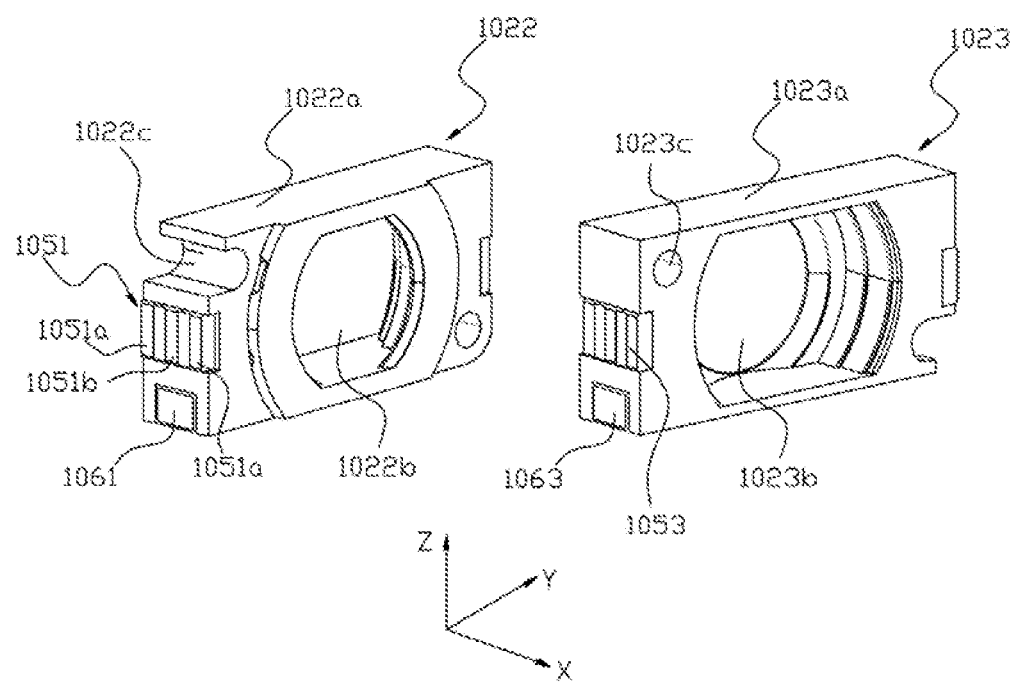
FIG. 2 is a schematic diagram showing the structure of a second lens group and a third lens group in accordance with the first embodiment of the invention.
Figure 3:
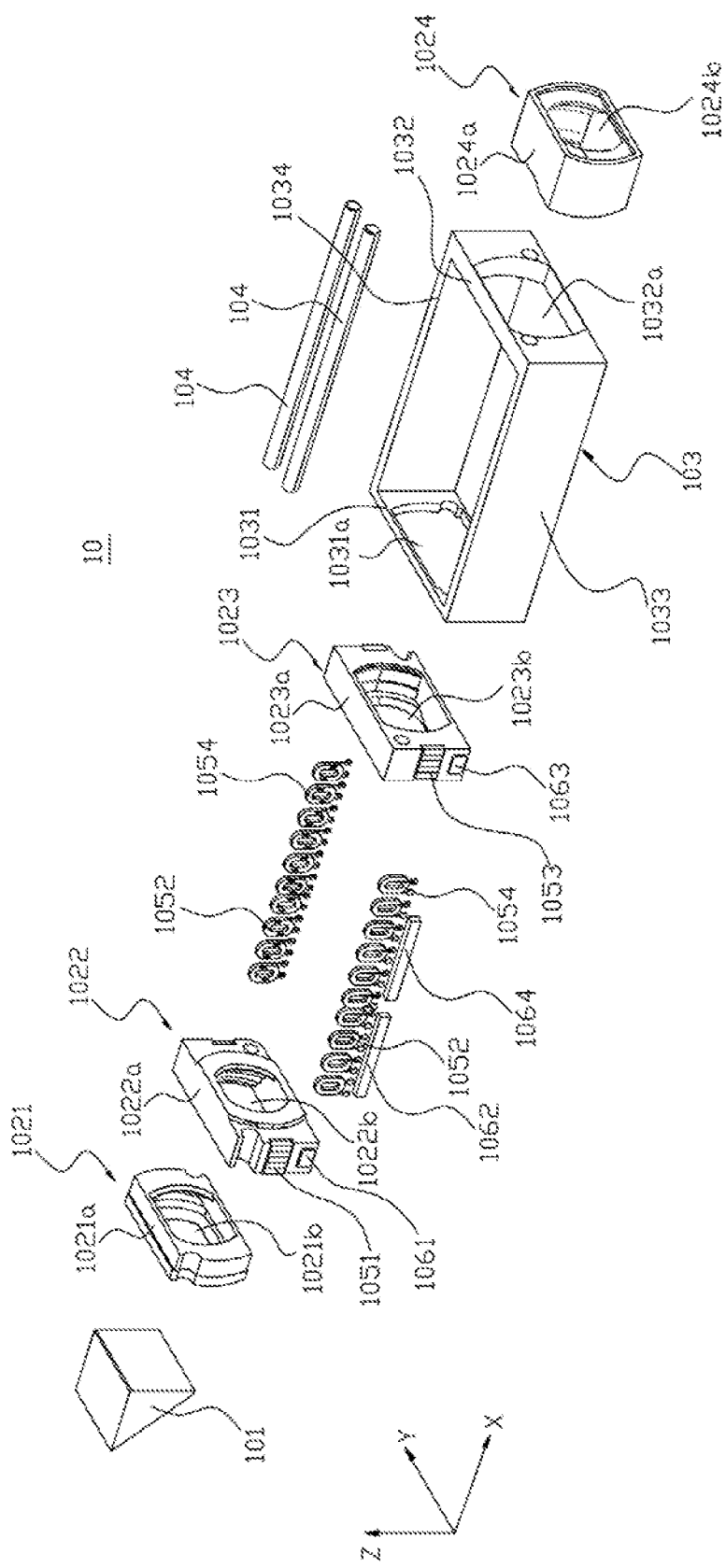
FIG. 3 is an exploded schematic diagram of the zoom lens in accordance with the first embodiment of the invention.

FIG. 1 is a schematic diagram showing the structure of a zoom lens 10 in accordance with a first embodiment of the invention. FIG. 2 is a schematic diagram showing the structure of a second lens group 1022 and a third lens group 1023 in accordance with the first embodiment of the invention. FIG. 3 is an exploded schematic diagram of the zoom lens 10 in accordance with the first embodiment of the invention. As shown in FIGS. 1-3, the zoom lens 10 of the invention includes a light path turning module 101, a lens module 102 and an image forming module (not shown) which are sequentially arranged in a first direction X. The lens module 102 has an optical axis extending in the first direction X.

The zoom lens 10 further includes a mount 103. The mount 103 includes a first side wall 1031, a second side wall 1032, a third side wall 1033 and a fourth side wall 1034, wherein the first side wall 1031 and the second side wall 1032 are disposed opposite to each other and are perpendicular to the first direction X, the third side wall 1033 and the fourth side wall 1034 are disposed opposite to each other and are perpendicular to a second direction Y, and the first direction X is perpendicular to the second direction Y. The first side wall 1031 and the second side wall 1032 are respectively provided with holes 1031a, 1032a allowing light to pass through. The light path turning module 101, the lens module 102 and the image forming module (not shown) are disposed on the mount 103 or in the mount 103.

The light path turning module 101 is configured to reflect the light coming from a third direction Z to propagate in the first direction X. Specifically, the light coming from the third direction Z is turned by the light path turning module 101 to propagate in the first direction X and sequentially enters the lens module 102 and the image forming module, wherein the third direction Z is perpendicular to the first direction X and the second direction Y. The light path turning module 101 can be driven by the driving unit to rotate about an axis extending in the second direction Y, for adjusting the direction in which the light is reflected to the lens module 102. However, the invention is not limited thereto. The light path turning module 101 can be further rotated about axes and/or an axis extending in the third direction Z and/or the first direction X. That is, the light path turning module 101 can be rotated about one axis, two axes or three axes to perform optical image stabilization (OIS) operation. In this embodiment, the light path turning module 101 is a prism. However, the invention is not limited thereto. The light path turning module 101 may be a prism or a reflective mirror. In a preferred embodiment, a reflective surface of the prism or reflective mirror is provided with a metal layer formed from, for example, aluminum (AL) or silver (Ag). The method of forming the metal layer includes (but is not limited to) plating, printing, coating and so on. By arrangement of the metal layer, both the chromatic aberration and flare can be avoided when an image is formed. Therefore, the invention is capable of improving chromatic aberration, effectively focusing the point light source, and providing the lens assembly with good image-forming quality.

The lens module 102 includes a plurality of lens groups wherein at least one lens group is movable along the optical axis extending in the first direction X. Each lens group has a lens frame and one or more lenses fixed to the lens frame. As shown in FIGS. 1-3, in this embodiment, the lens module 102 includes four lens groups, wherein a first lens group 1021 includes a first lens frame 1021a and one or more first lenses 1021b disposed in the first lens frame 1021a, a second lens group 1022 includes a second lens frame 1022a and one or more second lenses 1022b disposed in the second lens frame 1022a, a third lens group 1023 includes a third lens frame 1023a and one or more third lenses 1023b disposed in the third lens frame 1023a, and a fourth lens group 1024 includes a fourth lens frame 1024a and one or more fourth lenses 1024b disposed in the fourth lens frame 1024a.

In this embodiment, the second lens group 1022 and the third lens group 1023 are movable along the optical axis extending in the first direction X. However, this is only an example for a purpose of descriptions and the invention is not limited thereto.

In the mount 103, a guide unit is provided in the first direction X. In this embodiment, the guide unit includes guide rods 104. However, the invention is not limited thereto. The guide unit may include a guide rod(s), a guide ball(s), a rolling ball(s), a resilient element(s) or a guide rail(s). For example, a rolling ball(s) are disposed in one of the lens frame and the mount 103 while a groove corresponding to the rolling ball(s) is disposed in the other of the lens frame and the mount 103. For another example, a resilient element(s) are provided to connect the lens frame and the mount 103. For another example, a protruding portion is provided for one of the lens frame and the mount 103 while a guide rail corresponding to the protruding portion is provided for the other of the lens frame and the mount 103. Any means for guiding the lens group to move with respect to the mount 103 in the first direction X belongs to the category of the invention. In this embodiment, two guide rods 104 are provided. One guide rod 104 is connected between upper portions of the first side wall 1031 and the second side wall 1032 and is disposed near one of the third side wall 1033 and the fourth side wall 1034. The other guide rod 104 is connected between lower portions of the first side wall 1031 and the second side wall 1032 and is disposed near the other of the third side wall 1033 and the fourth side wall 1034. It is understood that the invention may provide only one guide rod 104, wherein the guide rod 104 is flat, or the mount 103 is configured to assist movement of the lens group in the first direction X. The arrangement that only one guide rod is provided also belongs to the category of the invention.

In the lens module 102, the second lens group 1022 and the third lens group 1023 are able to move along the optical axis. The second lens frame 1022a and the third lens frame 1023a of the second lens group 1022 and the third lens group 1023 are respectively provided with an opening 1022c and a hole 1023c coupled with the guide rod 104. By coupling of the opening 1022c and the hole 1023c with the guide rod 104, the guide rod 104 can guide the movement of the second lens group 1022 and the third lens group 1023 in the first direction X. The first lens group 1021 and the fourth lens group 1024 may be fixed to the guide rod 104 or the mount 103.

The zoom lens 10 further includes a driving device and a location sensing device. The driving device is configured to drive the movable lens groups to move in the first direction X. The location sensing device is electrically connected to the driving device. The driving device includes a magnet and a coil. The magnet is fixed to one of the movable lens group and the mount 103, while the coil is fixed to the other of the movable lens group and the mount 103. The location sensing device includes a location magnet fixed to the movable lens group, and a location sensor fixed to the mount 103.

In this embodiment depicted by figures, a first magnet 1051 is fixed to the side surface of the second lens group 1022, and first coils 1052 corresponding to the first magnet 1051 are fixed to the inner sides of the third wall 1033 and the fourth side wall 1034 of the mount 103. The number of the first coils 1052 is plural. The first coils 1052 are arranged close to or apart from each other in the first direction X. A second magnet 1053 is fixed to the side surface of the third lens group 1023, and second coils 1054 corresponding to the second magnet 1053 are fixed to the inner sides of the third side wall 1033 and the fourth side wall 1034 of the mount 103. The number of the second coils 1054 is plural. The second coils 1054 are arranged close to or apart from each other in the first direction X.

The side surface of the second lens group 1022 corresponding to the mount 103 and perpendicular to the second direction Y is provided with a concave first magnet containing portion. The first magnet containing portion may be located at the middle of the side surface of the second lens group 1022. The first magnet 1051 is disposed in the first magnet containing portion. Further, the first magnet 1051 may be a multipole magnet and includes different poles alternately disposed in the first direction X. In this embodiment depicted by figures, the first magnet 1051 may include two first magnetic poles 1051a and a second magnetic pole 1051b disposed between the first magnetic poles 1051a. However, the invention is not limited thereto. The first magnet 1051 may includes a plurality of first magnetic poles and a plurality of second magnetic poles disposed between the first magnetic poles.

The side surface of the third lens group 1023 corresponding to the mount 103 is provided with a concave second magnet containing portion. The second magnet containing portion may be located at the middle of the side surface of the third lens group 1023. The second magnet 1053 is disposed in the second magnet containing portion. The structure of the second magnet 1053 is the same as that of the first magnet 1051. Therefore, the description of structure of the second magnet 1053 is omitted.

Further, a first location magnet 1061 is fixed on the side surface of the second lens group 1022. The side surface of the second lens group 1022 corresponding to the mount 103 is provided with a concave first location-magnet containing portion. The first location-magnet containing portion may be disposed under the first magnet containing portion, i.e. at the lower part of the side surface of the second lens group 1022.

A plurality of first location sensors 1062 are fixed on the inner sides of the third side wall 1033 and the fourth side wall 1034 of the mount 103. The first location sensors 1062 are located corresponding to the first location magnets 1061. The first location sensors 1062 are electrically connected to the first coils 1052. For the zoom lens 10, the magnitude and direction of the electric current flowing in the first coils 1052 can be changed in accordance with the location of the second lens group 1022 sensed by the first location sensor 1062, thereby changing the direction of movement and the location of the second lens group 1022.

When supplied with power, the first coils 1052 interact with the first magnets 1051 so that the second lens group 1022 can move in the first direction X. The second lens group 1022 keeps moving to change its location until the forces applied to the first coils 1052 by the first magnetic pole 1051$a$ and the second magnetic pole 1051$b$ are in equilibrium. Thus, the second lens group 1022 stops moving and stays at the desired location.

A second location magnet 1063 is fixed to the side surface of the third lens group 1023. The side surface of the third lens group 1023 corresponding to the mount 103 is provided with a concave second location-magnet containing portion. The second location-magnet containing portion may be disposed under the second magnet containing portion, i.e. at the lower part of the side surface of the third lens group 1023.

A plurality of second location sensors 1064 are fixed on the inner sides of the third side wall 1033 and the fourth side wall 1034 of the mount 103. The second location sensors 1064 are electrically connected to the second coils 1054. Such arrangement is similar to that of the first location sensors 1062 and the first coils 1052, and therefore the descriptions thereof are omitted.

By means of movements of a part of lens groups, the zoom lens 10 is able to perform zoom or focus operation.

Figure 4:
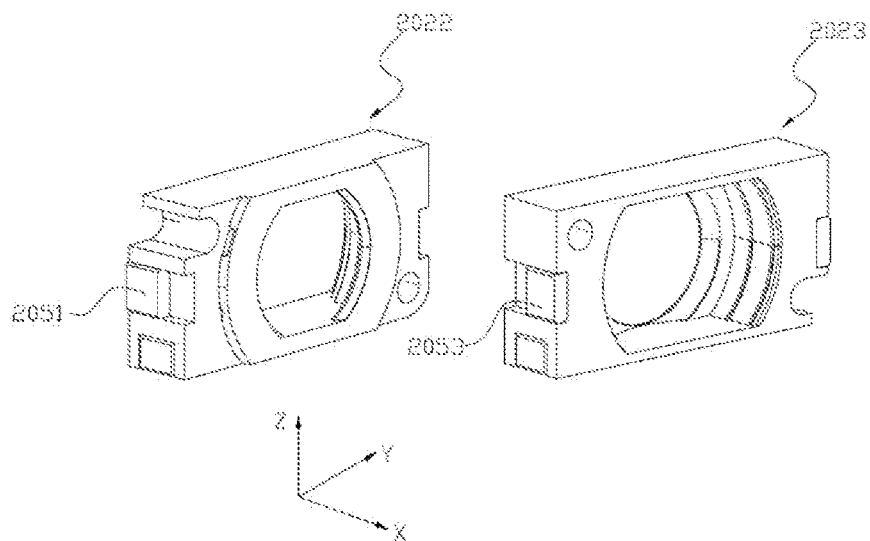
FIG. 4 is a schematic diagram showing the structure of a second lens group and a third lens group in accordance with the second embodiment of the invention.

FIG. 4 is a schematic diagram showing the structure of a second lens group 2022 and a third lens group 2023 in accordance with the second embodiment of the invention. The second embodiment is basically same as the first embodiment except for the first magnet of the second lens group. In the second embodiment, the first magnet 2051 of the second lens group 2022 is a monopole magnet. By changing the magnitude and direction of the electric current passed through the first coils, the magnitude and direction of the corresponding electromagnetic force can be changed. The second magnet 2053 disposed on the side surface of the third lens group 2023 is also a monopole magnet. However, the invention is not limited thereto. Both of the first magnet and the second magnet can be multipole magnets, or both are monopole magnets, or one is a multipole magnet and the other is a monopole magnet.

Figure 5:
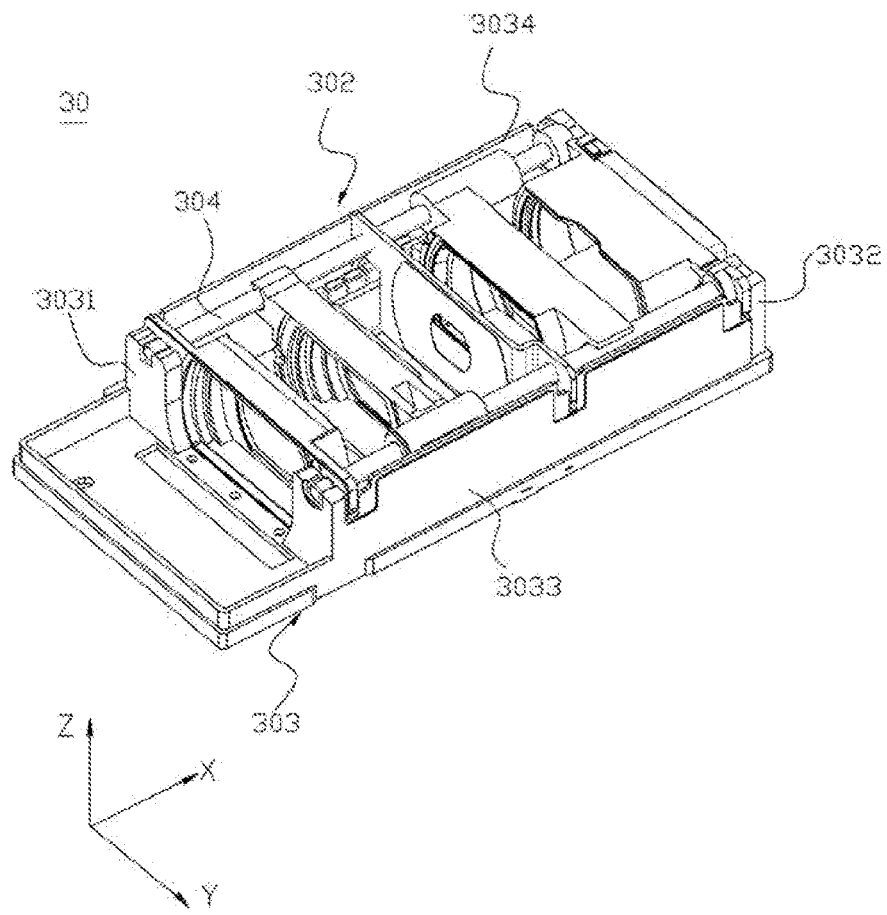
FIG. 5 is a schematic diagram showing the structure of a zoom lens in accordance with a third embodiment of the invention.
Figure 6:
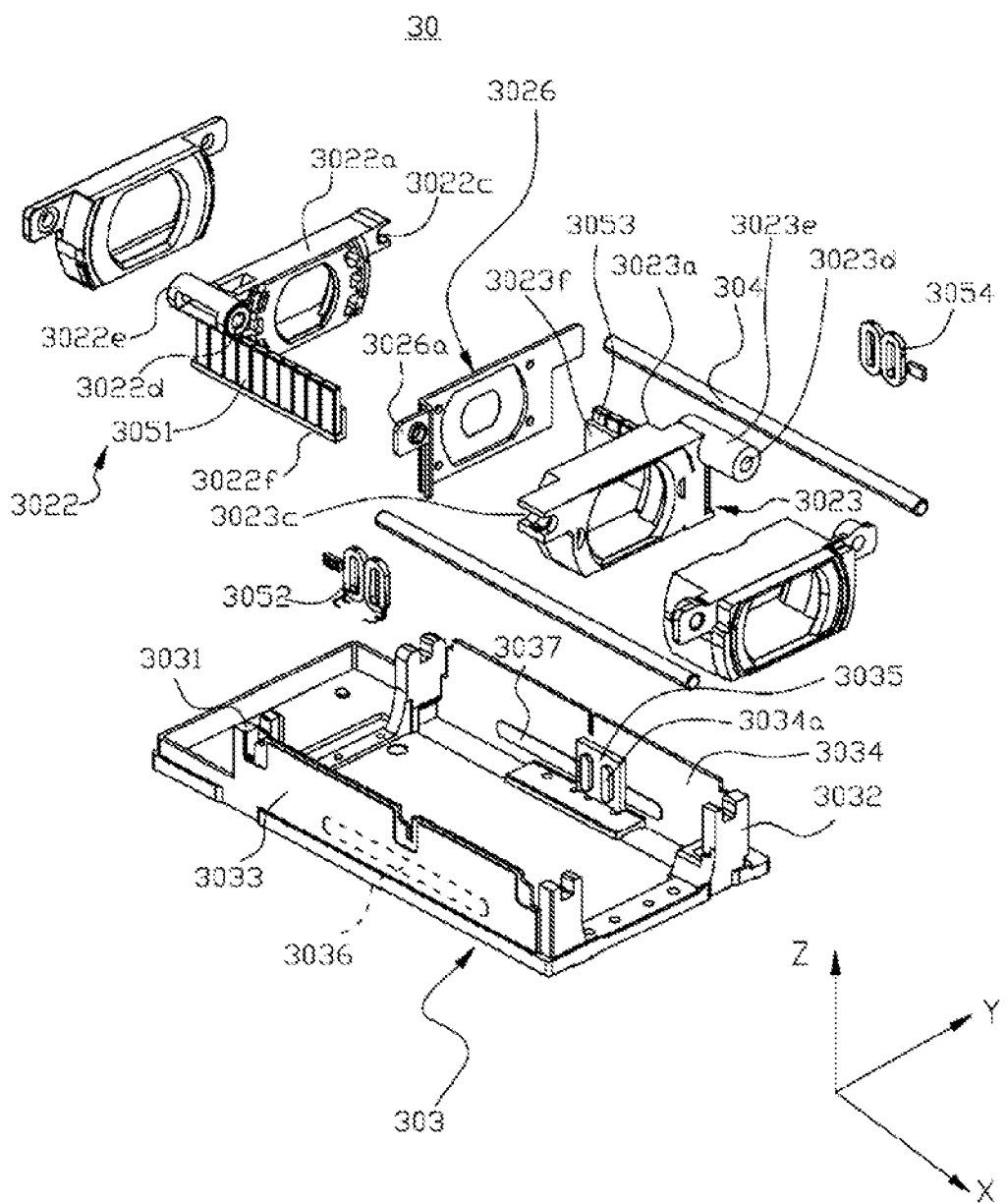
FIG. 6 is an exploded schematic diagram of the zoom lens in accordance with the third embodiment of the invention.
Figure 7:
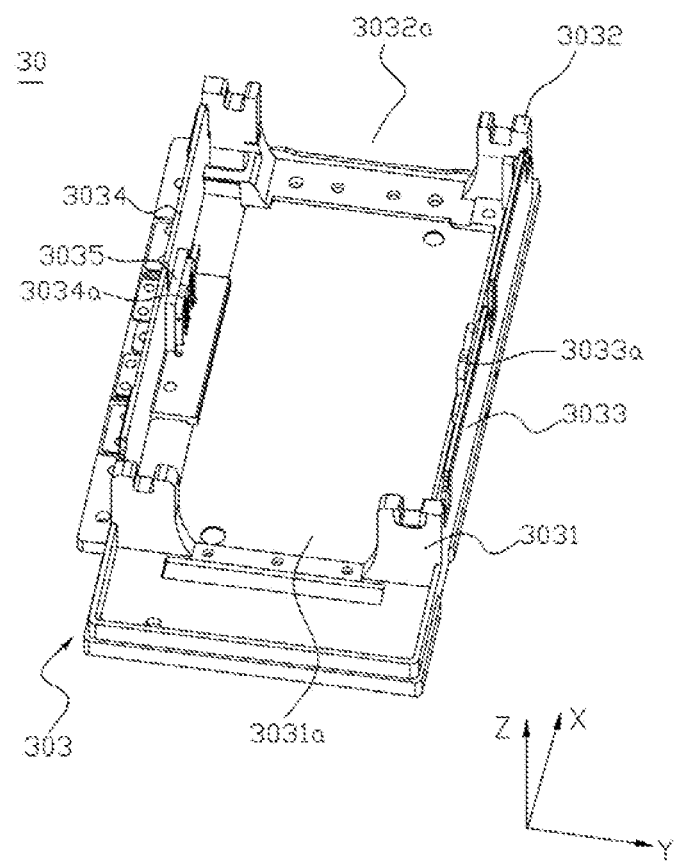
FIG. 7 is a schematic diagram showing the structure of a mount in accordance with the third embodiment of the invention.

FIG. 5 is a schematic diagram showing the structure of a zoom lens 30 in accordance with a third embodiment of the invention. FIG. 6 is an exploded schematic diagram of the zoom lens 30 in accordance with the third embodiment of the invention. FIG. 7 is a schematic diagram showing the structure of a mount 303 in accordance with the third embodiment of the invention. As shown in FIGS. 5-7, the zoom lens 30 of the invention includes a light path turning module (not shown), a lens module 302 and an image forming module (not shown) which are sequentially arranged in a first direction X. The lens module 302 has an optical axis extending in the first direction X. For brief description, the same parts between the third embodiment and the first embodiment will not be repeatedly described.

The zoom lens 30 further includes a mount 303. In this embodiment, the light passing holes 3031$a$, 3032$a$ defined by the first side wall 3031 and the second side wall 3032 are openings. The second lens group 3022 and the third lens group 3023 can be moved along the optical axis extending in the first direction X. In other words, the second lens group 3022 and the third lens group 3023 are movable lens groups. However, this is only an example taken for a purpose of descriptions and the invention is not limited thereto.

A guide unit is disposed in the mount 303 in the first direction X. In this embodiment, the guide unit includes at least two guide rods 304, wherein the guide rods 304 are respectively connected to sides of upper portions of the first side wall 3031 and the second side wall 3032. The second lens frame 3022$a$ is provided with an opening 3022$c$ and a hole 3022$d$ coupled with the guide rods 304, and has a connecting sleeve 3022$e$ at a side thereof. The connecting sleeve 3022$e$ extends in the first direction X and has the hole 3022$d$ coupled with one of the guide rods 304. The third lens frame 3023$a$ is provided with an opening 3023$c$ and a hole 3023$d$ coupled with the guide rods 304, and has a connecting sleeve 3023$e$ at a side thereof. The connecting sleeve 3023$e$ extends in the first direction X and has the hole 3023$d$ coupled with another guide rod 304.

The zoom lens 30 further includes a fixed aperture stop 3026 disposed between the second lens group 3022 and the third lens group 3023. The fixed aperture stop 3026 has a bent portion 3026$a$ formed on a side thereof. The bent portion 3026$a$ defines a hole allowing one of the guide rods 304 to pass through. Around the hole there is a surrounding structure extending in the first direction X (or parallel to the optical axis). By such arrangement, the coupling of the hole with the guide rod 304 can be more stable. The bent portion 3026$a$ has a planar part perpendicular to the first direction X (or the optical axis), while the fixed aperture stop 3026 also has a planar part perpendicular to the first direction X (or the optical axis). The planar part of the bent portion 3026$a$ is parallel to the planar part of the fixed aperture stop 3026, and the two planar parts are not overlapped. In other words, the bent portion 3026$a$ is integrally formed with a side of the fixed aperture stop 3026 to be a continuous-unity structure and to form a offset difference therebetween, thereby forming a space for the connecting sleeve 3022$e$ of the second lens group 3022. Thanks to the space, the length of the connecting sleeve 3022$e$ can be increased in the first direction X (or parallel to the optical axis), and the slant of the second lens group 3022 can be lessened when the second lens group 3022 is coupled with the guide rods 304. Accordingly, the second lens group 3022 can be avoided from slanting and can be more stable no matter in a state of movement or immobility.

Figure 8:
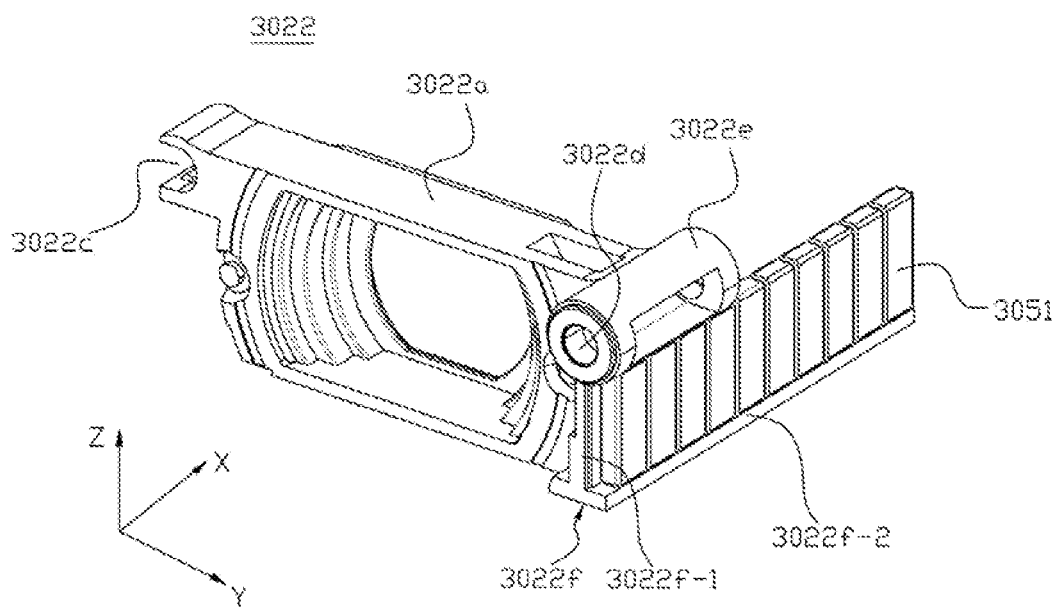
FIG. 8 is a schematic diagram showing the structure of the second lens group in accordance with the third embodiment of the invention.
Figure 9:
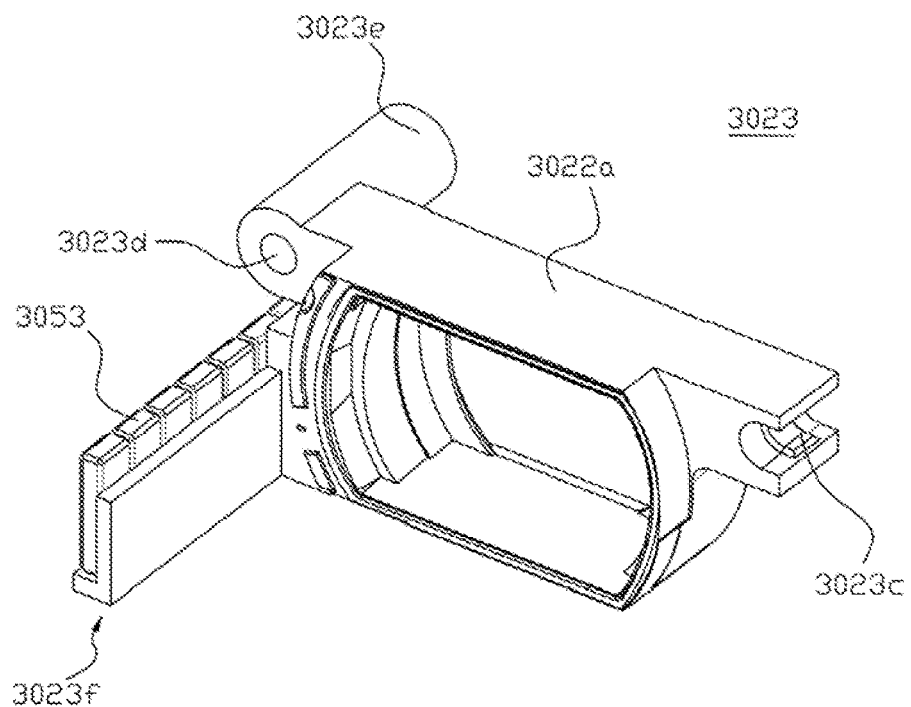
FIG. 9 is a schematic diagram showing the structure of the third lens group in accordance with the third embodiment of the invention.

FIG. 8 is a schematic diagram showing the structure of the second lens group 3022 in accordance with the third embodiment of the invention. FIG. 9 is a schematic diagram showing the structure of the third lens group 3023 in accordance with the third embodiment of the invention. As shown, in the third embodiment, a first mounting portion 3022f is disposed on the second lens frame 3022a of the second lens group 3022. The first mounting portion 3022f is formed on a side surface of the second lens frame 3022a, extends in the first direction X, and is disposed corresponding to the mount 303. The first mounting portion 3022f may be located under the opening 3022c or the hole 3022d coupled with the guide rod 304.

The first mounting portion 3022f is integrally formed with a side surface of the second lens frame 3022a to be a continuous-unity structure. The first mounting portion 3022f is planar. The first magnet 3051 or the first coil 3052 is fixed to the first mounting portion 3022f. The first mounting portion 3022f is provided with a recess for correspondingly containing the first magnet 3051 or the first coil 3052.

Optionally, the first mounting portion 3022f is L-shaped and has a first part 3022f-1 connected to the side surface of the second lens frame 3022a, and a second part 3022f-2 extending from the first part 3022f-1 towards the mount 303. As shown, the first part 3022f-1 extends in a plane formed by the first direction X and the third direction Z. The second part 3022f-2 extends in another plane formed by the first direction X and the second direction Y.

The first magnet 3051 and the first coil 3052 are disposed corresponding to each other, wherein one of the first magnet 3051 and the first coil 3052 is fixed to the first mounting portion 3022f while the other of the first magnet 3051 and the first coil 3052 is fixed to the mount 303. The first mounting portion 3022f may be disposed on the side surface of the second lens frame 3022a that is corresponding to the third side wall 3033, or disposed on the side surface of the second lens frame 3022a that corresponding to the fourth side wall 3034, or each of the two side surfaces of the second lens frame 3022a has a first mounting portions 3022f disposed thereon that corresponding to third side wall 3033 and the fourth side wall 3034.

In this embodiment depicted by figures, an end of the first mounting portion 3022f is fixed to the second lens frame 3022a. Specifically, the first part 3022f-1 of the first mounting portion 3022f is fixed to the second lens frame 3022a. Alternatively, a middle part (not an end) of the first mounting portion 3022f is fixed to the second lens frame 3022a.

FIG. 9 is a schematic diagram showing the structure of the third lens group 3023 in accordance with the third embodiment of the invention. The third lens group 3023 is similar to the second lens group 3022 in structure. The third lens frame 3023a of the third lens group 3023 is provided with a second mounting portion 3023f, and therefore the description thereof in detail is omitted.

To avoid interference between the first mounting portion 3022f of the second lens group 3022 and the second mounting portion 3023f of the third lens group 3023 and to reduce the volume of the zoom lens, it is preferable that the first mounting portion 3022f of the second lens group 3022 is disposed corresponding to one of the third side wall 3033 and the fourth side wall 3034, the second mounting portion 3023f of the third lens group 3023 is disposed corresponding to the other of the third side wall 3033 and the fourth side wall 3034, and the first mounting portion 3022f of the second lens group 3022 and the second mounting portion 3023f of the third lens group 3023 extend towards each other in the first direction X. By such arrangement, the first mounting portion 3022f and the second mounting portion 3023f can be contained in the space between the second lens group 3022 and the third lens group 3023.

In this embodiment depicted by figures, the first mounting portion 3022f has the first magnet 3051 fixed thereto. The third mounting portion 3023f has the second magnet 3053 fixed thereto. The third side wall 3033 has the first coil 3052 fixed thereto that corresponds to the first magnet 3051. The fourth side wall 3034 has the second coil 3054 fixed thereto that corresponds to the second magnet 3053. Specifically, the third side wall 3033 and the fourth side wall 3034 are respectively provided with a first coil fixing portion 3033a and a second coil fixing portion 3034a. The first coil fixing portion 3033a and the second coil fixing portion 3034a may be protrusions. The first coil 3052 and the second coil 3054 hang on the protrusions through their own holes and therefore are fixed thereto. The first coil fixing portion 3033a and the second coil fixing portion 3034a may be directly disposed on the third side wall 3033 and the fourth side wall 3034, or may be disposed on the fixing boards 3035 connected to the third side wall 3033 and the fourth side wall 3034. It is understood that the third side wall 3033 and the fourth side wall 3034 may respectively have location sensing devices (e.g. Hall sensors) provided thereon for sensing the moving distances or locations of the movable lens groups.

Referring back to FIG. 6, in a preferred embodiment, magnetic shielding elements (e.g. metal pieces) 3036, 3037 are disposed on inner surfaces of the third side wall 3033 and the fourth side wall 3034 of the mount 303 and are disposed corresponding to the first magnet 3051 and the second magnet 3053. The magnetic shielding elements 3036, 3037 extend in the first direction X (or parallel to the optical axis), wherein a length of the magnetic shielding element 3036 is greater than or equal to the moving distance of the first magnet 3051, and a length of the magnetic shielding element 3037 is greater than or equal to the moving distance of the second magnet 3053. By such arrangement, the magnetic field lines are limited and concentrated within the mount 303, and it will make the second lens group 3022 and the third lens group 3023 are kept in position when supply of power ceases. Therefore, when supply of power ceases, the second lens group 3022 and the third lens group 3023 can be avoided from shaking and accidental impacts caused by external forces.

Figure 10:
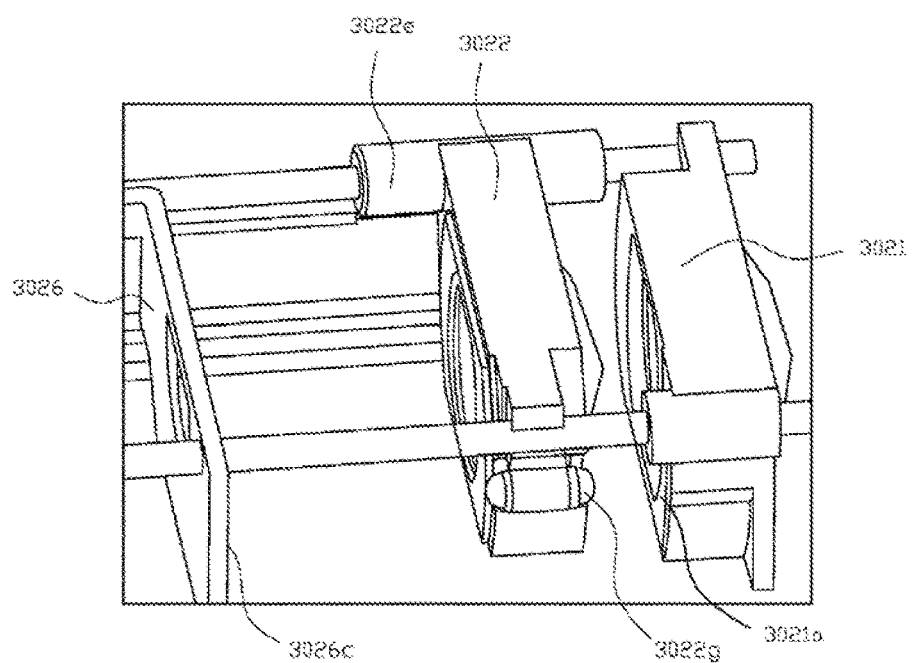
FIG. 10 is a schematic diagram showing a local structure of the lens module of the zoom lens in accordance with the fourth embodiment of the invention.

FIG. 10 is a schematic diagram showing the local structure of the lens module of the zoom lens in accordance with the fourth embodiment of the invention. The part of this embodiment same as that of the third embodiment will not be repeatedly described in the following. A cushion element 3022g is additionally disposed on a side of the second lens group 3022 for reducing noise arising from impact of the second lens group 3022 onto the first lens group 3021 or the fixed aperture stop 3026. Therefore, the cushion element 3022g is capable of providing cushioning effect, capable of avoiding lens groups from damaging or scratching, and capable of promoting shock resistance and reliability. In particular, when supply of power ceases, the second lens group 3022 may slide and collide with the first lens group 3021 or the fixed aperture stop 3026 to generate noise. Therefore, it is required that the cushion element 3022g has sufficient material strength to avoid deformation of the lens groups and fixed aperture stop caused by collision. Further, cushioning material (e.g. liquid silicon based material) may be applied to the contact portions 3021*a*, 3026*c* between the first lens group 3021, the fixed aperture stop 3026 and the cushion element 3022*g* and be left still until the cushioning material is stiffened. Due to the characteristic of silicon based material, the noise caused by collision can be reduced and the deformation of the lens groups and fixed aperture stop can be avoided.

Figure 11:
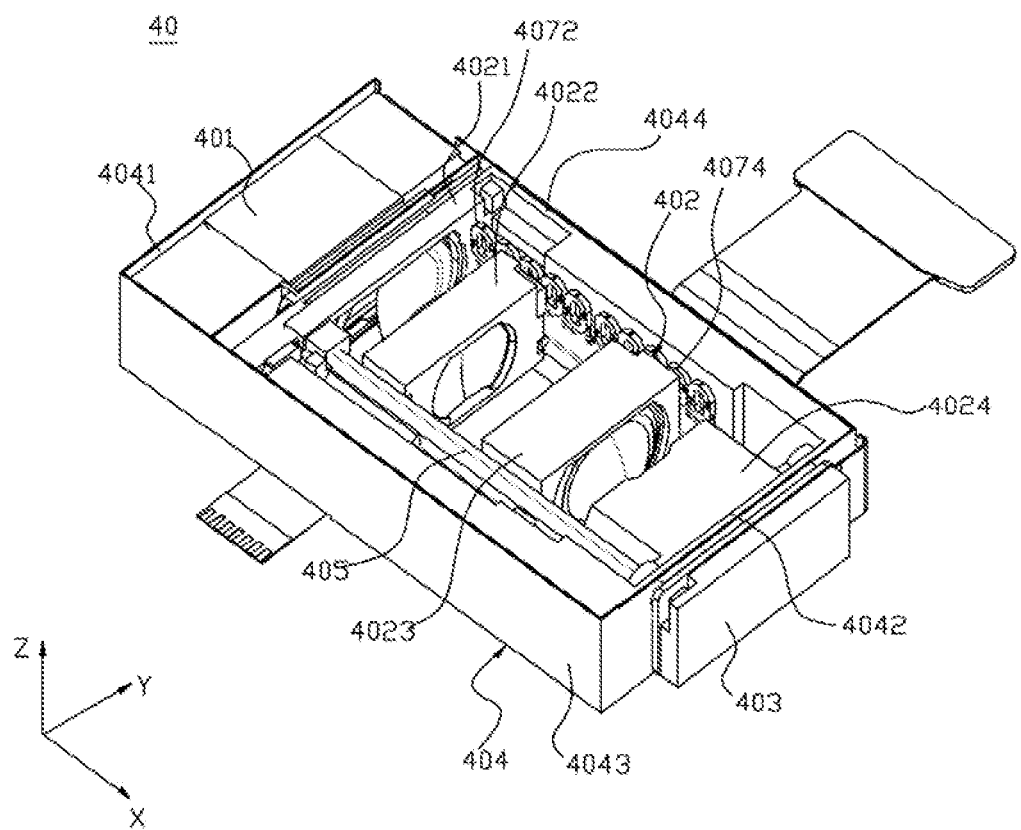
FIG. 11 is a schematic diagram showing the structure of a zoom lens in accordance with a fifth embodiment of the invention.
Figure 12:
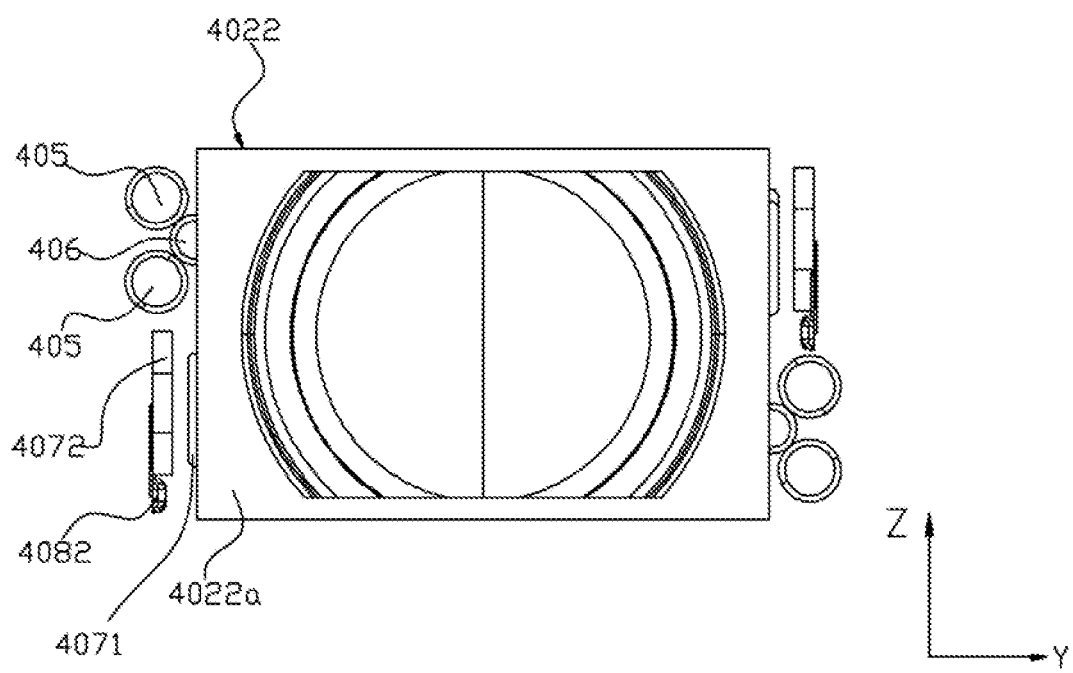
FIG. 12 is a schematic diagram showing the structure of a second lens group in accordance with the fifth embodiment of the invention.
Figure 13:
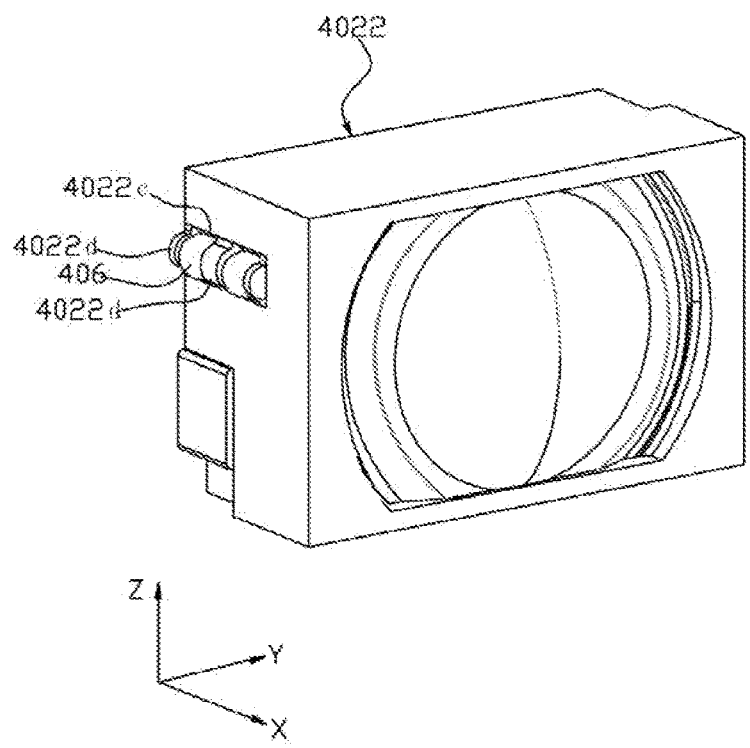
FIG. 13 is another schematic diagram showing the structure of the second lens group in accordance with the fifth embodiment of the invention.
Figure 14:
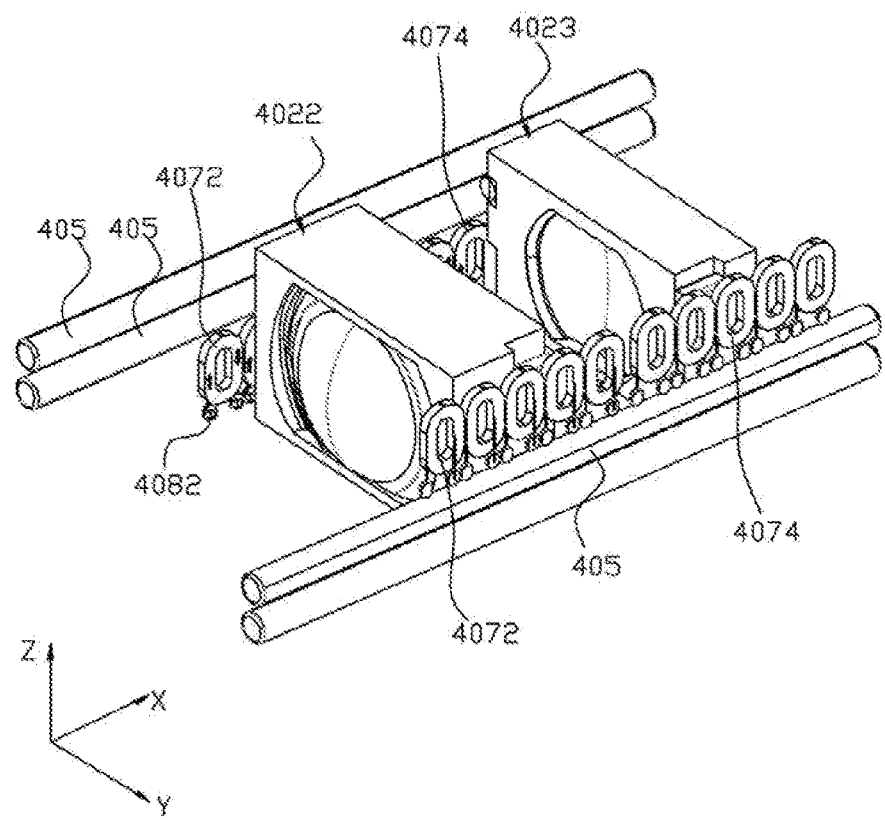
FIG. 14 is a schematic diagram showing the structure of the second lens group and a third lens group in accordance with the fifth embodiment of the invention.
Figure 15:
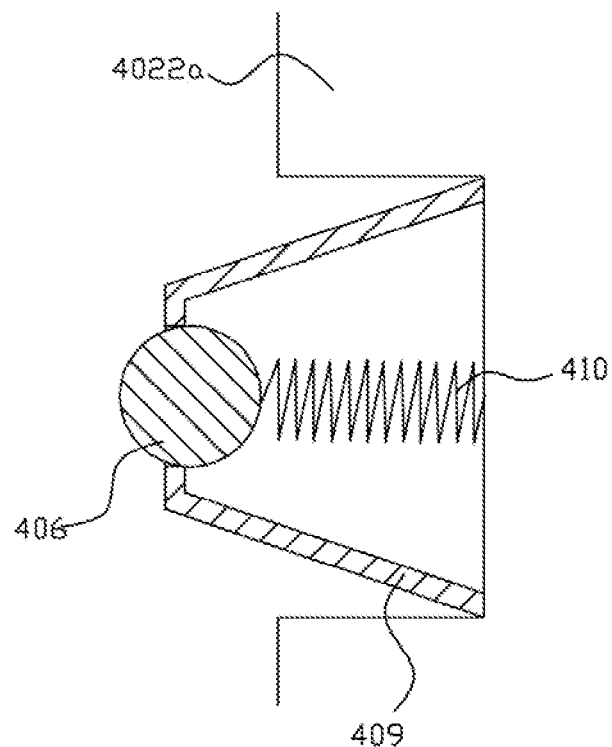
FIG. 15 is a schematic diagram showing the structure of a rolling ball holder in accordance with the sixth embodiment of the invention.

FIG. 11 is a schematic diagram showing the structure of a zoom lens 40 in accordance with a fifth embodiment of the invention. FIG. 12 is a schematic diagram showing the structure of a second lens group 4022 in accordance with the fifth embodiment of the invention. FIG. 13 is another schematic diagram showing the structure of the second lens group 4022 in accordance with the fifth embodiment of the invention. FIG. 14 is a schematic diagram showing the structure of the second lens group 4022 and a third lens group 4023 in accordance with the fifth embodiment of the invention. As shown in FIGS. 11-14, in the fifth embodiment of the invention, the zoom lens 40 includes a light path turning module 401, a lens module 402 and an image forming module 403 which are sequentially arranged in a first direction X. The lens module 402 has an optical axis extending in the first direction X. For brief description, the same parts of the first, second and third embodiments will not be repeatedly described.

The zoom lens 40 further includes a mount 404. The mount 404 includes a first side wall 4041, a second side wall 4042, a third side wall 4043 and a fourth side wall 4044. The first side wall 4041 and the second side wall 4042 are disposed opposite to each other and are perpendicular to the first direction X. The third side wall 4043 and the fourth side wall 4044 are disposed opposite to each other and are perpendicular to the second direction Y. The first direction X is perpendicular to the second direction Y. The first side wall 4041 and the second side wall 4042 have light passing holes allowing light to pass through. The light path turning module 401, the lens module 402 and the image forming module 403 may be disposed on or in the mount 404.

The light path turning module 401 is configured to turn propagation of light from the third direction Z to the first direction X by reflection. In other words, light coming from the third direction Z is turned to propagate in the first direction X by the light path turning module 401 and sequentially enters the lens module 402 and the image forming module 403. The third direction Z is perpendicular to the first direction X and the second direction Y. The light path turning module 401 can be driven by a driving unit to rotate about an axis extending in the second direction Y, thereby adjusting the reflective direction of the light to the lens module 402.

As described above, the light path turning module 401 can be rotated about an axis extending in the second direction Y. However, the invention is not limited thereto. The light path turning module 401 may be configured to further rotate about an axis extending in the third direction Z and/or an axis extending in the first direction X. That is, the light path turning module 401 can be configured to rotate about one axis, two axes and/or three axes for performing operation of optical image stabilization. In this embodiment, the light path turning module 401 is a prism. However, the invention is not limited thereto. The light path turning module 401 may be a reflective mirror. In some preferred embodiments, the prism or reflective mirror may have the reflective surface coated with a metal layer that contains aluminum (AL) or silver (Ag). The method of forming the metal layer includes (but is not limited to) plating, printing, coating and so on. By arrangement of the metal layer, both the chromatic aberration and flare can be avoided when an image is formed. Therefore, the invention is capable of improving chromatic aberration, effectively focusing the point light source, and providing the lens assembly with good image-forming quality.

The lens module 402 includes a plurality of lens groups in which at least one lens group is movable along the optical axis extending in the first direction X. Each of the lens groups includes a lens frame and one or more lenses fixed in the lens frame. In this embodiment depicted by figures, the lens module 402 includes four lens groups wherein the first lens group 4021 includes a first lens frame and one or more lenses disposed in the first lens frame, the second lens group 4022 includes a second lens frame and one or more lenses disposed in the second lens frame, the third lens group 4023 includes a third lens frame and one or more lenses disposed in the third lens frame, and the fourth lens group 4024 includes a fourth lens frame and one or more lenses disposed in the fourth lens frame.

In this embodiment, the second lens group 4022 and the third lens group 4023 are able to move along the optical axis extending in the first direction X. However, such arrangement is only an example taken for the purpose of descriptions. The invention is not limited thereto.

In the mount 404, a guide unit is disposed in the first direction X. In this embodiment, the guide unit includes at least two groups of guide rods 405, wherein one group of guide rods 405 is connected to upper portions of the first side wall 4041 and the second side wall 4042 and is disposed near one of the third side wall 4043 and the fourth side wall 4044, and the other group of guide rods 405 is connected to upper portions or lower portions of the first side wall 4041 and the second side wall 4042 and is disposed near the other of the third side wall 4043 and the fourth side wall 4044. Each group of guide rods 405 includes two adjacent guide rods 405.

Each group of guide rods 405 has corresponding rolling balls 406 provided in the lens frame of the movable lens group. The rolling balls 406 are in contact with the corresponding guide rods 405 and are able to roll along the guide rods 405 in the first direction X.

It is understood that the number of each group of guide rods 405 is not limited to two. When the guide rods 405 are provided with recesses corresponding to the rolling balls 406, the number of each group of guide rods 405 may be only one.

In FIGS. 12 and 13, the second lens group 4022 is taken as an example for describing the movable lens group. Specifically, the lens frame 4022*a* of the second lens group 4022 is provided with a recess 4022*c* and a plurality of spacers 4022*d* are extended in the second direction Y and are fixed in the recess 4022*c*. The number of the spacers 4022*d* is at least two. Each spacer 4022*d* has a ball containing portion disposed on its surface directed towards the adjacent spacer 4022*d*. Each two adjacent spacers 4022*d* have rolling balls 406 disposed therebetween and the rolling balls 406 are rollable. The rolling ball 406 are partially protruded from the second lens frame 4022*a*, are extended beyond the spacers 4022*c*, are in contact with two guide rods 405 of the same group, and are rollable thereon.

The recesses 4022*c* are provided only for reducing the thickness of the zoom lens 40 in the second direction Y because the spacers 4022*d* and rolling balls can be partially contained in the lens frame 4022*a*. It is therefore understood that the recesses 4022*c* are not necessary elements. For example, the spacers 4022*d* may be directly connected to the lens frame 4022*a*.

The ball containing portion may be a concave portion disposed on the spacer 4022d. The concave portion may be a part of spherical surface that fits the rolling ball 406 and allows the rolling ball 406 to roll. However, the invention is not limited thereto. The ball containing portion may be a round hole or a partially elliptical hole disposed on the spacer 4022d. That is, the ball containing portion may include a spherical surface, a part of spherical surface, a round hole or a part of round hole allowing a contact with the rolling ball 406. When the ball containing portion includes a part of round hole in contact with the rolling ball, the part of round hole is symmetric about an axis extending in the first direction X.

The rolling ball 406 can be disposed on the second lens group 4022 in other ways. FIG. 14 is a schematic diagram showing the structure of a rolling ball holder in accordance with a sixth embodiment. In this embodiment, the lens frame 4022a of the second lens group 4022 is provided with a recess in which the rolling ball holder 409 is fixed. The rolling ball holder 409 is a base (e.g. a conical base) and has a trapezoidal section when sectioned along a plane perpendicular to the third direction Z. The trapezoidal section has a top side smaller than a bottom side. The bottom of the rolling ball holder 409 is fixed to the second lens group 4022 and the rolling ball holder 409 has an opening on the top. The rolling ball 406 is disposed in the rolling ball holder 409 and is protruded from the opening on the top of the rolling ball holder 409. A diameter of the rolling ball 406 is greater than a dimension of the opening on the top of the rolling ball holder 409. Therefore, the rolling ball 406 cannot fall out of the rolling ball holder 409. A resilient element 410 is disposed in the rolling ball holder 409, is propped against the rolling ball 406 and the bottom of the rolling ball holder 409, and constantly pushes the rolling ball 406 towards the mount 404. Preferably, the rolling ball 406 under the elastic force of the resilient element 410 is able to roll but is almost immovable in the second direction Y. Further, a tray with a curved surface can be disposed between the rolling ball 406 and the resilient element 410. The tray is connected to the resilient element and supports the rolling ball 406 with the curved surface so that the rolling ball 406 is stable.

Referring back to FIG. 11, in the fifth embodiment, the two guide rods 405 of the same group are aligned with each other in the third direction Z. However, the invention is not limited thereto. The two guide rods 405 are allowed to be slightly aligned off from each other. Such arrangement is acceptable as long as the two guide rods 405 can still contact with the rolling balls 406.

In the fifth embodiment shown in FIG. 11, a section of the guide rod 405 (sectioned along a plane perpendicular to the first direction X) is round. However, the invention is not limited thereto. For example, the section of the guide rod 405 may include an arced portion for contacting the guide rod 405. For another example, the section of the guide rod 405 is elliptical or partially elliptical. For a third example, the section of the guide rod 405 is in shape of semicircle or a part of circle. For a fourth example, the guide rod 405 has a concave portion and a section of the concave portion has a shape of a part of arc when the concave portion is sectioned along a plane perpendicular to the first direction X. The rolling ball 406 is partially contained in the concave portion and is able to roll therein.

The first lens group 4021 and the fourth lens group 4024 may be fixed to the guide rods 405 or the mount 404.

The zoom lens 40 further includes a driving device for driving the movable lens groups to move in the first direction X, and a location sensing device electrically connected to the driving device. The driving device includes magnets fixed to one of the movable lens group and the mount 404, and coils fixed to the other of the movable lens group and the mount 404. The location sensing device includes location magnets fixed to the movable lens groups and location sensors fixed to the mount 404.

In this embodiment depicted by figures, a first magnet 4071 is fixed to the side surface of the second lens group 4022, and first coils 4072 corresponding to the first magnet 4071 are fixed to the inner sides of the third wall 4043 and the fourth side wall 4044. Although the number of the first coils 4072 is plural, use of only one first coil is feasible. The first coils 4072 are arranged close to or apart from each other in the first direction X. A second magnet is fixed to the side surface of the third lens group 4023, and second coils 4074 corresponding to the second magnet are fixed to the inner sides of the third wall 4043 and the fourth side wall 4044 of the mount 404. Although the number of the second coils 1054 is plural, use of only one first coil is feasible. The second coils 4074 are arranged close to or apart from each other in the first direction X.

The locations of the first magnet 4071 and the first coils 4072 can be exchanged. That is, the first magnet 4071 is disposed on the inner sides of the third wall 4043 and the fourth side wall 4044 of the mount 404, and the first coils 4072 are disposed on the side surface of the second lens group 4022. Under such circumstance, the number of first magnet 4071 and first coils 4072 may be changed. Specifically, there are plural first magnets 4071 arranged in the first direction X and there is only one first coil 4072 (or few first coils). The second magnet 4073 and the second coils 4074 are similar to the first magnet 4071 and the first coils 4072, and therefore the descriptions thereof are omitted.

The side surface of the second lens group 4022 corresponding to the mount 404 and perpendicular to the second direction Y is provided with a concave first magnet containing portion. The first magnet 4071 is disposed in the first magnet containing portion. Further, the first magnet 4071 may be a multipole magnet and includes different poles alternately disposed in the first direction X. As shown in figures, in this embodiment, the first magnet 4071 may include two first magnetic poles and a second magnetic pole disposed between the first magnetic poles. However, the invention is not limited thereto. The first magnet 4071 may includes a plurality of first magnetic poles and a plurality of second magnetic poles disposed between the first magnetic poles.

The side surface of the third lens group 4023 corresponding to the mount 404 is provided with a concave second magnet containing portion. The second magnet containing portion can be disposed at the middle of the side surface of the third lens group 4022. The second magnet 4073 is disposed in the second magnet containing portion. The structure of the second magnet 4073 is similar to that of the first magnet 4071 and therefore the description thereof is omitted.

A first location magnet is fixed to the side surface of the second lens group 4022. A concave first location-magnet containing portion is disposed on the side surface of the second lens group 4022 corresponding to the mount 404. The first location-magnet containing portion is disposed under the first magnet containing portion, i.e. disposed at the lower part of the side surface of the second lens group 4022. First location sensors 4082 are fixed at the inner sides of the third side wall 4043 and the fourth side wall 4044 of the mount 404. The first location sensors 4082 are located corresponding to the first location magnets. The first location sensors 4082 are electrically connected to the first coils 4072. For the zoom lens 40, the magnitude and direction of the electric current in the first coils 4072 can be changed in accordance with the location of the second lens group 4022 sensed by the first location sensor 4082, thereby changing the direction of movement and the location of the second lens group 4022.

When supplied with power, the first coils 4072 interact with the first magnets 4071 so that the second lens group 4022 can move in the first direction X. The second lens group 4022 keeps moving and changes its location until the forces applied to the first coils 4072 by the first magnetic pole and the second magnetic pole are in equilibrium. Thus, the second lens group 4022 stops moving and stays at the predetermined location.

A second location magnet is fixed to the side surface of the third lens group 4023. The side surface of the third lens group 4023 corresponding to the mount 404 is provided with a concave second location-magnet containing portion. The second location-magnet containing portion may be disposed under the second magnet containing portion, i.e. at the lower part of the side surface of the third lens group 4023.

Second location sensors are fixed on the inner sides of the third side wall 4043 and the fourth side wall 4044 of the mount 404. The second location sensors are electrically connected to the second coils 4074. Such arrangement is similar to that of the first location sensors 4082 and the first coils 4072, and therefore the descriptions thereof are omitted.

By means of movements of a part of lens groups, the zoom lens 40 is able to perform zoom or focus operation.

Both of the first magnet 4071 and the second magnet can be multipole magnets, or both are monopole magnets, or one is a multipole magnet and the other is a monopole magnet.

Figure 16:
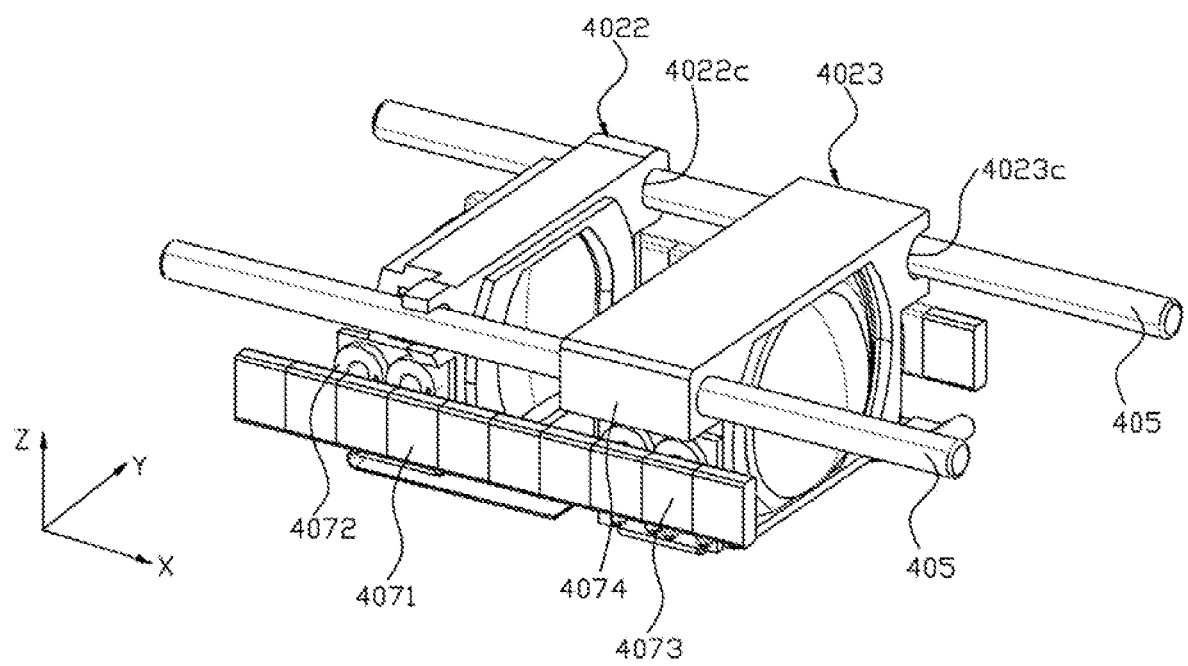
FIG. 16 is a schematic diagram showing the structure of the second lens group and the third lens group in accordance with the seventh embodiment of the invention.

FIG. 16 is a schematic diagram showing the structure of the second lens group and the third lens group in accordance with the seventh embodiment of the invention. The seventh embodiment and the fifth embodiment have the same parts and therefore the descriptions thereof are omitted. In the seventh embodiment, a guide unit 405 is disposed in the first direction X. In this embodiment, the guide unit 405 includes at least two groups of guide rods 405, wherein one group is connected to upper portions of the first side wall 4041 and the second side wall 4042 and is disposed near one of the third side wall 4043 and the fourth side wall 4044, and the other group is connected to upper portions of the first side wall 4041 and the second side wall 4042 and is disposed near the other of the third side wall 4043 and the fourth side wall 4044. Each group includes only one guide rod 405.

The lens frames of the movable lens groups are no longer provided with rolling balls. The second lens frame and the third lens frame of the second lens group 4022 and the third lens group 4023 are respectively provided with a hole 4022c and an opening 4023c coupled with the guide rod 405. By coupling of the hole 4022c and the opening 4023c with the guide rod 405, the guide rod 405 can guide the movement of the second lens group 4022 and the third lens group 4023 in the first direction X. Either of the lens frames can be provided with a hole at a side and provided with an opening at another side. The first lens group 4021 and the fourth lens group 4024 may be fixed to the guide rod 405 or the mount 404.

In this embodiment depicted by figures, first coils 4072 are fixed to the side surface of the second lens group 4022, and first magnets 4071 corresponding to the first coils 4072 are fixed to the inner sides of the third wall 4043 and the fourth side wall 4044 of the mount 404. The number of the first magnets 4071 is plural. The first magnets 4071 are arranged close to or apart from each other in the first direction X. The number of the first coils 4072 is also plural. In this embodiment depicted by figures, the number of first coils 4072 is two. Second coils 4074 are fixed to the side surface of the third lens group 4023, and second magnets 4073 corresponding to the second coils 4074 are fixed to the inner sides of the third side wall 4043 and the fourth side wall 4044. The number of the second magnets 4073 is plural. The second magnets 4073 are arranged close to or apart from each other in the first direction X. The number of the second coils 4074 is plural. In this embodiment depicted by figures, the number of second coils 4074 is two.

In the eighth embodiment of the invention, a first coil 4072 is fixed to the side surface of the second lens group 4022, and the number of the first coil 4072 is only one. A second coil 4074 is fixed to the side surface of the third lens group 4023, and the number of the second coil 4074 is also only one. Other parts of the eighth embodiment are the same as those of the fifth embodiment or the sixth embodiment, and therefore the descriptions thereof are omitted.

The zoom lens of the invention is able to change the focal length and provide stable and smooth zoom or focus operation. As compared to the conventional zoom lens, the zoom lens of the invention is able to operate without any noise or abnormal noise. Besides, the volume of the zoom lens is not increased that can meet the requirement of miniaturization of lenses.

In the above embodiments, during the optical zoom process from a wide-angle end to a telephoto end, the first lens group is stationary, the second lens group is moved towards the object side, the third lens group is moved towards the image side, and the fourth lens group is stationary, wherein the object side is the side at which a photographed object is located and the image side is the side at which the image forming module is located. However, the invention is not limited thereto. For example, the second lens group and the third lens group can be replaced with a single movable lens group. Alternatively, the second lens group and the third lens group can be replaced with a single stationary lens group while the first lens group and the fourth lens group are moved to perform the zoom operation. Specifically, the zoom lens of the invention is included in an image capture apparatus (for example, foldable telephoto camera). The zoom lens includes a light path turning module, a lens module, an image forming module and a driving module. The lens module includes a first lens group, a second lens group and a third lens group. During operation, light passes through the light path turning module and the lens module to form an image on the image forming module. The driving device is able to move the second lens group with respect to the image forming module in a direction parallel to the optical axis of the zoom lens, so that the zoom lens can enter two zoom states. The first lens group and the third lens group are kept fixed with respect to each other. The second lens group is disposed between the first lens group and the third lens group. By means of movement of the second lens group, the first lens group and the second lens group can be joined together or close to each other in a zoom state, or the third lens group and the second lens group can be joined together or close to each other in another zoom state.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A zoom lens, comprising:
   a mount;
   a guide unit disposed in the mount in a first direction;
   a plurality of lens groups disposed in the mount and comprising at least one movable lens group which can be moved along the guide unit;
   a driving device for driving the movable lens group;
   wherein the driving device comprises magnets and coils;
   wherein the magnets are fixed to one of the movable lens group and the mount, while the coils are fixed to the other one of the movable lens group and the mount;
   wherein the magnets and/or the coils are arranged in the first direction;
   wherein the movable lens group comprises side surfaces corresponding to the mount, the side surfaces comprise a concave magnet containing portion and a concave location-magnet containing portion disposed under the magnet containing portion.

2. The zoom lens as claimed in claim 1, further comprising a location sensing device electrically connected to the driving device wherein the location sensing device comprises a location magnet fixed to the movable lens group, and a location sensor fixed to the mount.

3. The zoom lens as claimed in claim 1, wherein the guide unit comprises a guide rod, a guide ball, a rolling ball, a resilient element or a guide rail, for guiding the movable lens group to move along the guide unit in the first direction.

4. The zoom lens as claimed in claim 2, wherein the magnets are disposed in the magnet containing portion, and the location magnet is disposed in the location-magnet containing portion.

5. The zoom lens as claimed in claim 1, wherein the mount further comprises a first side wall, a second side wall, a third side wall and a fourth side wall, wherein the first side wall and the second side wall are disposed opposite to each other, the third side wall and the fourth side wall are disposed opposite to each other, the guide unit comprises at least two guide rods, one of the guide rods is connected between upper portions of the first side wall and the second side wall and is disposed near one of the third side wall and the fourth side wall, and the other of the guide rods is connected between the upper portions or between lower portions of the first side wall and the second side wall and is disposed near the other one of the third side wall and the fourth side wall.

6. The zoom lens as claimed in claim 5, wherein the magnets are fixed to the side surface of the movable lens group, and the coils are fixed to inner sides of the third side wall and the fourth side wall of the mount.

7. The zoom lens as claimed in claim 1, wherein the movable lens group comprises a side surface and a mounting portion disposed on the side surface and extending in the first direction, the mounting portion and the mount are disposed with respect to each other, and the magnets or the coils are fixed to the mounting portion.

8. The zoom lens as claimed in claim 7, wherein the mounting portion is L-shaped and comprises a first portion connected to the side surface of the movable group and a second portion extending from the first portion towards the mount.

9. The zoom lens as claimed in claim 1, wherein the lens groups comprise two movable lens groups, the two movable lens groups comprise side surfaces and mounting portions disposed on the side surfaces and extending in the first direction, the mounting portions are disposed with respect to the mount, the magnets or the coils are fixed to the mounting portions, the mount comprises two side walls, the mounting portions of the two movable lens groups and the two side walls of the mount are disposed corresponding to each other, and the mounting portions of the two movable lens groups extend towards each other in the first direction.

10. The zoom lens as claimed in claim 1, wherein the guide unit comprises a guide rod, the movable lens group comprises a rolling ball corresponding to the guide rod, and the rolling ball contacts the guide rod and is movable along the guide rod in the first direction.

11. The zoom lens as claimed in claim 10, wherein the guide unit comprises at least two guide rod groups, each guide rod group comprises two guide rods disposed adjacent to each other, the mount further comprises a first side wall, a second side wall, a third side wall and a fourth side wall, the first side wall and the second side wall are disposed opposite to each other, the third side wall and the fourth side wall are disposed opposite to each other, one of the guide rods is connected between upper portions of the first side wall and the second side wall and is disposed near one of the third side wall and the fourth side wall, and the other of the guide rods is connected between the upper portions or between lower portions of the first side wall and the second side wall and is disposed near the other one of the third side wall and the fourth side wall.

12. The zoom lens as claimed in claim 11, wherein the movable lens group further comprises a lens frame and a plurality of spacers, the spacers are fixed to the lens frame and extend in a second direction, the rolling ball is disposed between the spacers, the rolling ball is rollable, and the first direction is perpendicular to the second direction.

13. The zoom lens as claimed in claim 12, wherein the lens frame defines a recess, the spacers are firmly disposed in the recess, the spacers comprise ball containing portions, and the ball containing portions are concave or are holes.

14. The zoom lens as claimed in claim 10, wherein the movable lens group further comprises a lens frame, the lens frame defines a recess, the movable lens group further comprises a resilient element, and a rolling ball holder firmly disposed in the recess, the rolling ball holder defines an opening, the resilient element and the rolling ball are disposed in the rolling ball holder, the resilient element is propped against the rolling ball in a second direction so that the rolling ball protrudes from the opening, a diameter of the rolling ball is greater than a dimension of the opening, and the second direction is perpendicular to the first direction.

15. The zoom lens as claimed in claim 14, wherein the rolling ball holder is a base that is conical and has a trapezoidal section when sectioned along a plane perpendicular to a third direction, the third direction is perpendicular to the first direction and the second direction.

16. The zoom lens as claimed in claim 1, further comprising a fixed aperture stop disposed between an object side and an image side, wherein the movable lens group comprises a connecting sleeve movably coupled to the guide unit, and the fixed aperture stop comprises a bent portion to provide a space for receiving the connecting sleeve.

17. The zoom lens as claimed in claim 16, wherein the lens groups further comprises a fixed lens group, the movable lens group comprises a cushion element, and the fixed lens group and the fixed aperture stop comprises contact portions corresponding to the cushion element.

18. The zoom lens as claimed in claim 17, further comprising cushioning material provided on the contact portions of the fixed lens group and the fixed aperture stop.

19. An image capture apparatus comprising a zoom lens, wherein:
- the zoom lens comprises a light path turning module, a lens module, an image forming module and a driving device whereby light passes through the light path turning module and the lens module to form an image on the image forming module;
- the lens module comprises a first lens group, a second lens group, a third lens group and a fourth lens group, wherein the first lens group and the fourth lens group are fixed;
- the driving device is configured to move the second lens group and the third lens group with respect to the image forming device in a direction parallel to an optical axis of the zoom lens;
- the second lens group and the third lens group are respectively moved towards the first lens group and the fourth lens group, when driven by the driving device in a zoom state;
- the second lens group and the third lens group are moved close to each other when driven by the driving device in another zoom state;
- the zoom lens further comprises a mount, a guide unit disposed in the mount, and a fixed aperture stop disposed between an object side and an image side, wherein the second lens group comprises a connecting sleeve movably coupled to the guide unit, and the fixed aperture stop comprises a bent portion to provide a space for receiving the connecting sleeve.

20. A zoom lens comprising:
- a mount;
- a guide unit disposed in the mount and comprising a guide rod that is extended in a first direction;
- a plurality of lens groups disposed in the mount and comprising at least one movable lens group which can be moved along the guide unit;
- a driving device for driving the movable lens group;
- a rolling ball holder;
- a rolling ball disposed in the rolling ball holder and movable along the guide rod;
- a resilient element propped against the rolling ball in a second direction;
- wherein the driving device comprises magnets and coils;
- wherein the magnets are fixed to one of the movable lens group and the mount, while the coils are fixed to the other one of the movable lens group and the mount;
- wherein the magnets and/or the coils are arranged in the first direction;
- wherein the rolling ball holder is a base that is conical and has a trapezoidal section when sectioned along a plane perpendicular to a third direction, the third direction is perpendicular to the first direction and the second direction.

* * * * *